US008210749B2

(12) United States Patent
Mandel et al.

(10) Patent No.: US 8,210,749 B2
(45) Date of Patent: Jul. 3, 2012

(54) POWDER METAL BEARING CAP BREATHING WINDOWS

(75) Inventors: Joel H. Mandel, Hartford, WI (US); Donald J. Phillips, Menomonee Falls, WI (US); Rainer Schmitt, Wachtberg (DE)

(73) Assignee: GKN Sinter Metals, Inc., Auburn Hills, MI (US)

( * ) Notice: Subject to any disclaimer, the term of this patent is extended or adjusted under 35 U.S.C. 154(b) by 318 days.

(21) Appl. No.: 12/531,416

(22) PCT Filed: Mar. 21, 2008

(86) PCT No.: PCT/US2008/057798
§ 371 (c)(1), (2), (4) Date: Jan. 7, 2010

(87) PCT Pub. No.: WO2008/118773
PCT Pub. Date: Oct. 2, 2008

(65) Prior Publication Data

US 2010/0104229 A1 Apr. 29, 2010

Related U.S. Application Data

(60) Provisional application No. 60/896,551, filed on Mar. 23, 2007.

(51) Int. Cl.
*F16C 7/00* (2006.01)
*B22F 3/035* (2006.01)

(52) U.S. Cl. ........... 384/434; 384/279; 384/902; 419/66

(58) Field of Classification Search .................. 384/279, 384/430, 432–434, 902; 419/66
See application file for complete search history.

(56) References Cited

U.S. PATENT DOCUMENTS

| | | | | |
|---|---|---|---|---|
| 5,378,416 A * | 1/1995 | Kishi et al. | ................... | 264/40.5 |
| 5,503,795 A * | 4/1996 | Hubbard | ......................... | 419/38 |
| 6,318,986 B1 * | 11/2001 | Hinzmann et al. | .............. | 425/78 |
| 6,626,576 B1 | 9/2003 | Cadle et al. | | |
| 2002/0170161 A1 | 11/2002 | Cadle et al. | | |
| 2008/0298996 A1 * | 12/2008 | Kuplen et al. | .................. | 419/66 |

FOREIGN PATENT DOCUMENTS

| | | |
|---|---|---|
| DE | 2058923 A1 | 6/1972 |
| DE | 2154704 A1 | 6/1973 |
| DE | 102005038915 A1 | 3/2007 |

OTHER PUBLICATIONS

The International Search Report and Written Opinion as mailed on Jul. 2, 2008 for International Patent Application PCT/US2008/57798.

European Patent Office, Supplementary European Search Report for corresponding Application No. EP 08 74 4173, dated Apr. 23, 2012, Munich, Germany.

* cited by examiner

*Primary Examiner* — Thomas R Hannon
(74) *Attorney, Agent, or Firm* — Quarles & Brady LLP

(57) ABSTRACT

The present invention provides a PM main bearing cap, and its precursor compact, with an undercut breathing window that is formed during a compaction process. By fabricating the undercut during the compaction process, the invention eliminates the need for a secondary machining operation to form the undercut feature in the bearing caps.

14 Claims, 4 Drawing Sheets

40
10'
60
58
42
46
44
48
50
52

POWDER METAL BEARING CAP BREATHING WINDOWS

CROSS REFERENCE TO RELATED APPLICATIONS

This application represents the national stage application of International Application PCT/US2008/057798 filed 21 Mar. 2008, which claims the benefit of U.S. provisional application Ser. No. 60/896,551, filed on Mar. 23, 2007, which are herein incorporated by reference in their entirety for all purposes.

STATEMENT REGARDING FEDERALLY SPONSORED RESEARCH OR DEVELOPMENT

Not applicable.

FIELD OF THE INVENTION

This invention relates to producing powder metal (PM) bearing caps with "breathing windows", and in particular to producing breathing windows in powder metal main bearing caps for internal combustion engines.

BACKGROUND OF THE INVENTION

Crankshaft main bearing caps used in internal combustion engines can create a blockage between engine bays that results in a reduction in oil movement through the crankcase and increased localized crankcase pressures. The reduced oil movement between bays can cause excess pressure buildup below the pistons and rob the engine of horsepower.

A current solution is to machine an undercut breathing window in the main bearing cap blanks, whether made of powder metal or cast iron. The undercut feature or window aids in the breathing or movement of oil from one bay in the engine to the other, thereby reducing internal engine pressures and increasing horsepower. Machining in this feature however is time consuming and costly.

SUMMARY OF THE INVENTION

The present invention is to produce a PM main bearing cap, and its precursor compact, with an undercut breathing window that is formed during a compaction process. By fabricating the undercut during the compaction process, the invention eliminates the need for a secondary machining operation to form the undercut feature in the bearing caps.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
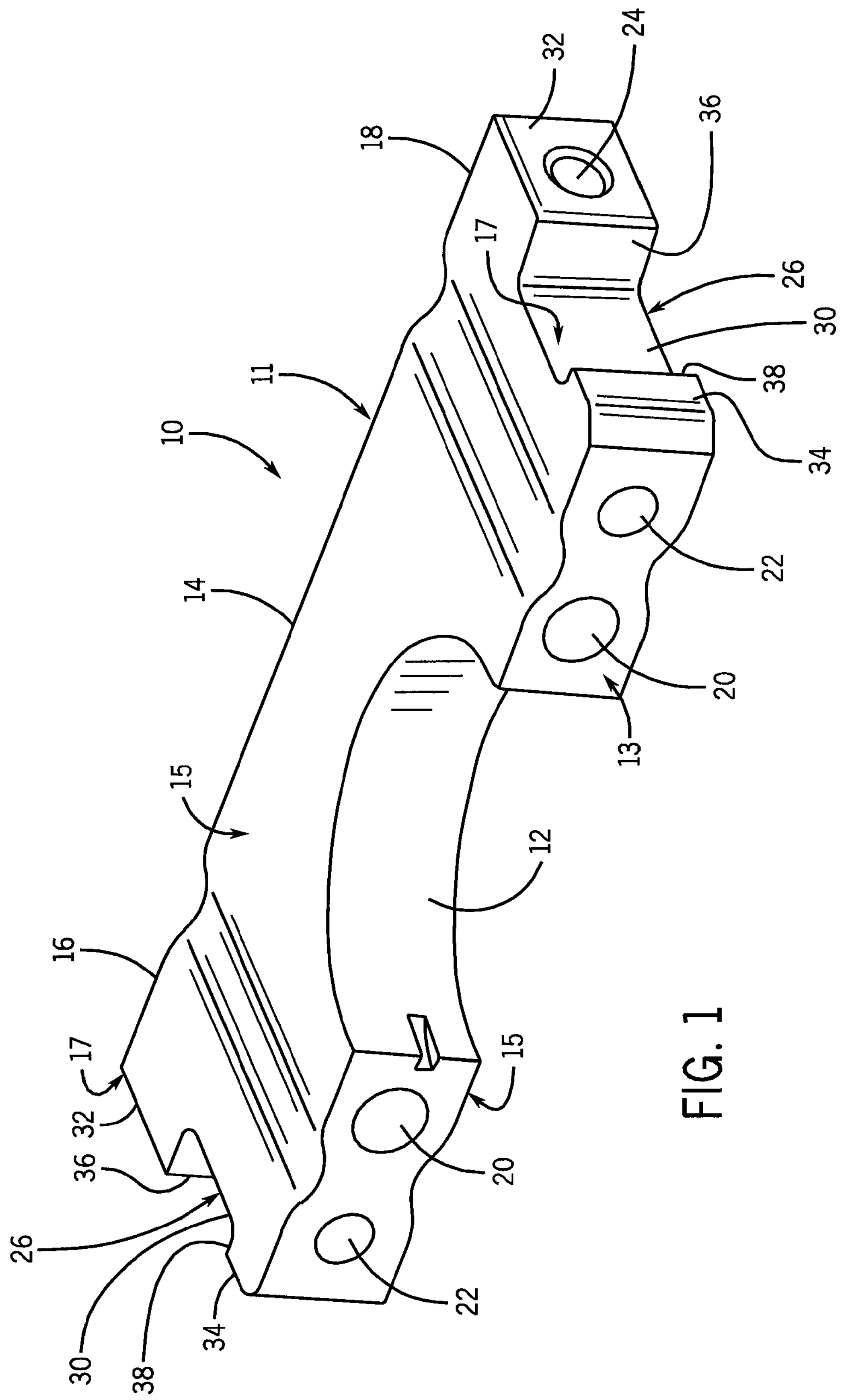
FIG. 1 is a perspective view of a PM main bearing cap of the invention formed with breathing windows.

FIG. 1 illustrates a main bearing cap 10 having a top surface 11, a bottom surface 13, side surfaces 15, and end surfaces 17. The bottom surface 13 has a half cylindrical surface 12 that defines half of the bearing hole for an engine crankshaft journal. The bearing cap 10 has a bridge 14 over the surface 12 and legs 16 and 18 on opposite sides of the surface 12 and the bridge 14. Inner bolt holes 20 and outer bolt holes 22 extend through the legs 16 and 18, through which bolts may extend to secure the cap 10 to the engine block. A pair of side bolt holes 24 may also be provided in the end surfaces 17 of the cap 10. The end surfaces 17 of the cap 10 also each have a groove or undercut 26, which provides a breathing window as described above.

The U-shaped undercut 26 has a side surface 30 that is depressed, indented, or inwardly offset from end-facing surfaces 32 and 34 of the ends of the cap 10. Upper inward-facing surface 36 and lower inward-facing surface 38 connect the respective side surfaces 30 with the end-facing surfaces 32 and 34.

Figure 2:
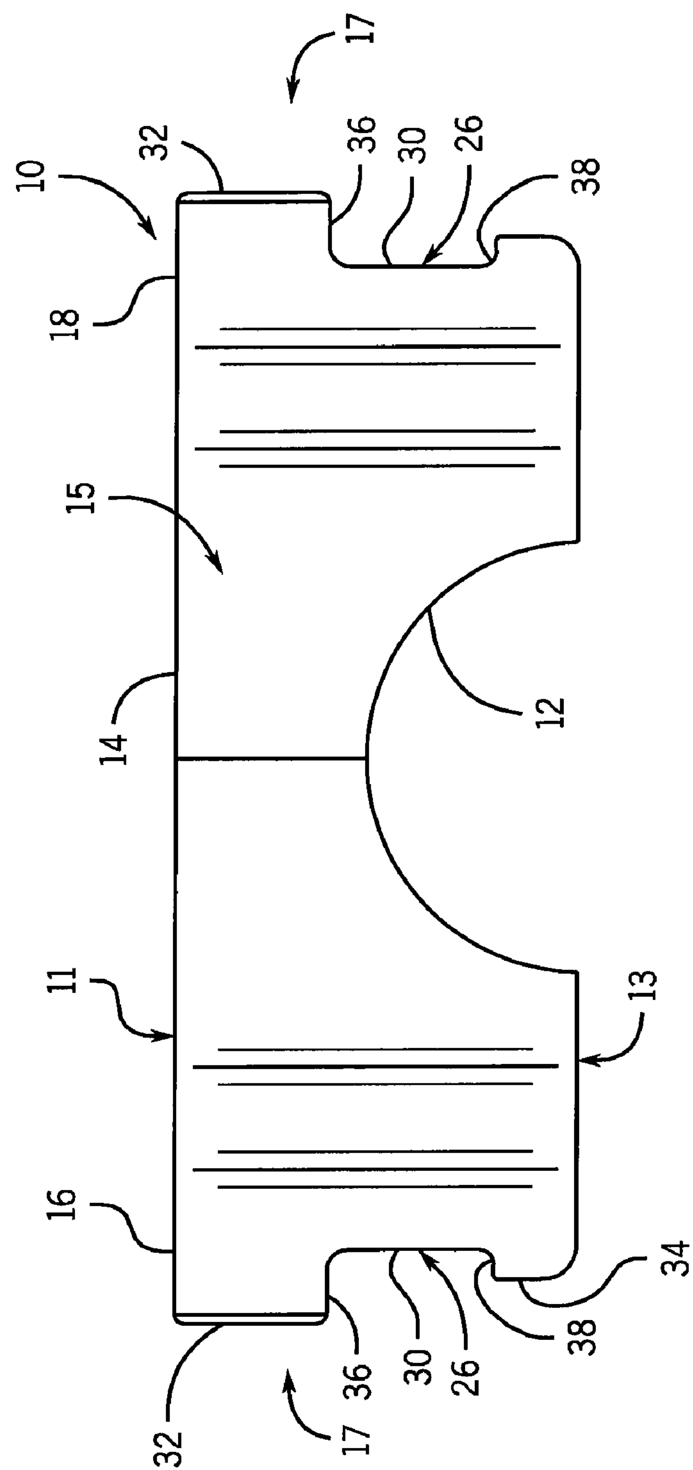
FIG. 2 is a front plan view of the bearing cap of FIG. 1.
Figure 3:
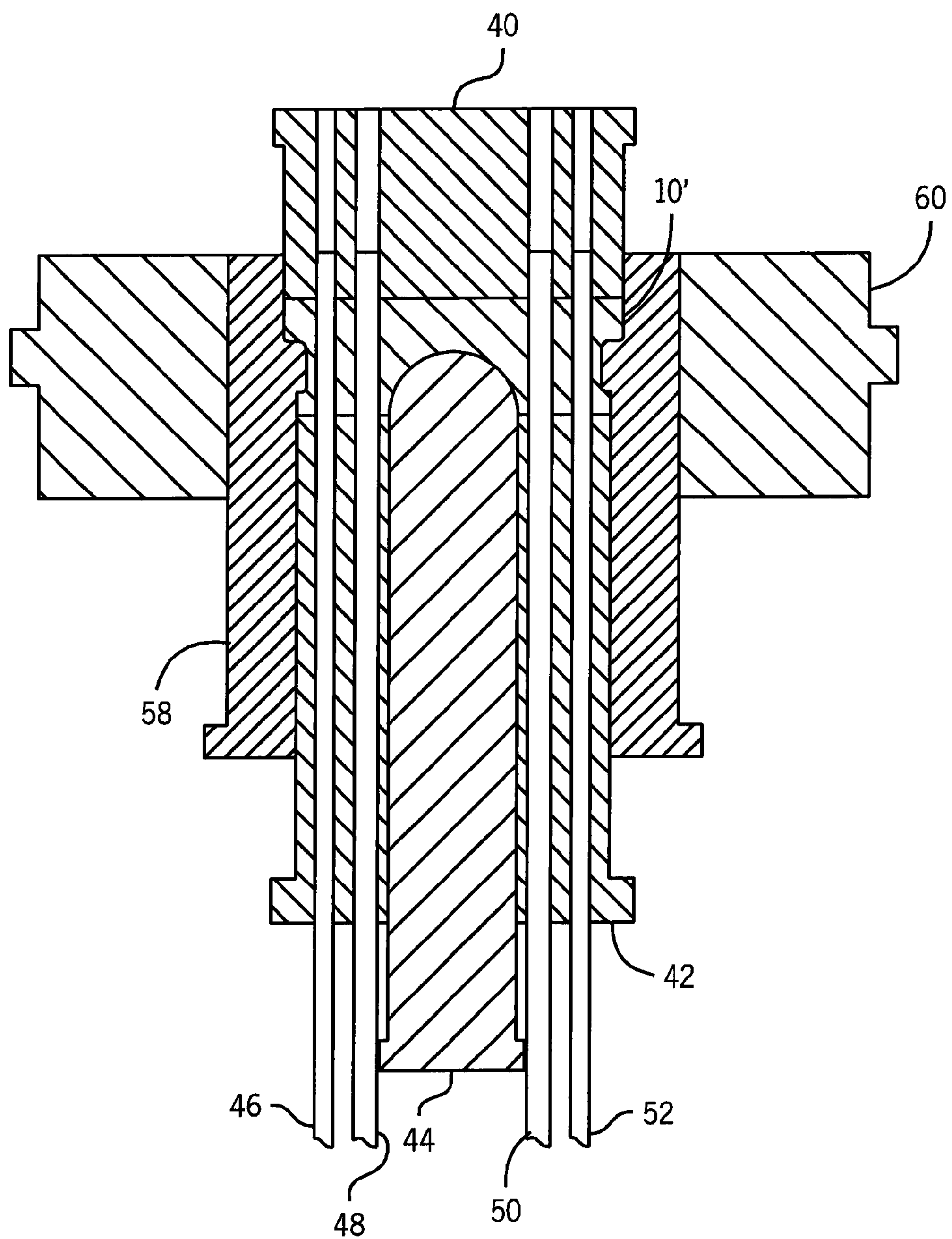
FIG. 3 is a cross-sectional view of a die set compressing powder metal to make a compact of the bearing cap of FIGS. 1 and 2.
Figure 4:
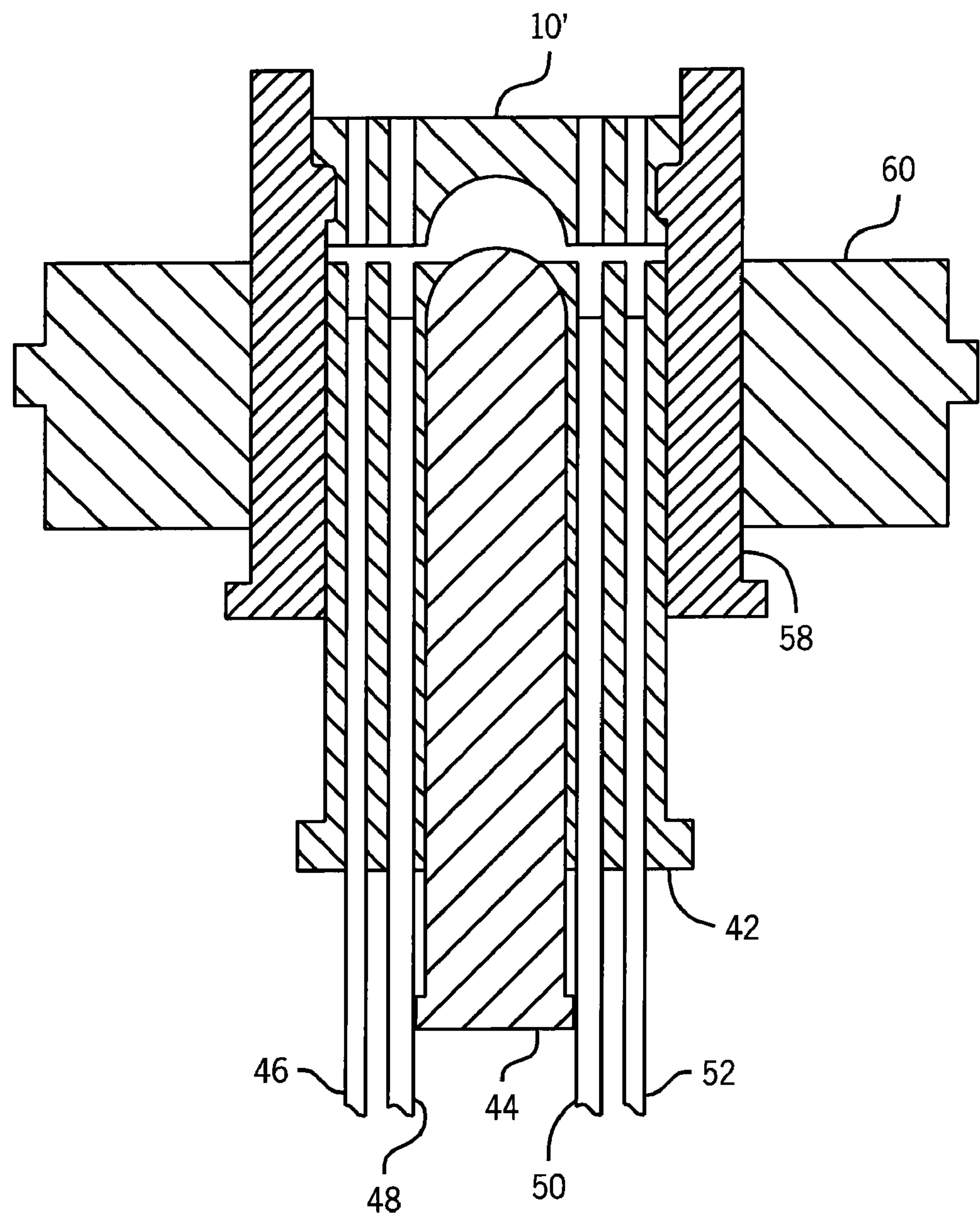
FIG. 4 is a view like FIG. 3 with the upper punch withdrawn and the outer punch extended, with the compact ready to be slid out from between the legs of the outer punch.

The main bearing cap 10 can be produced using, for example, CNC controlled compaction presses with at least four platens for each level of tool member including the core rods. The method of production is to use punches to produce the cap 10 shown in FIGS. 1 and 2. Referring to FIGS. 3 and 4, PM powder or compact 10', corresponding in shape to cap 10 and which after compaction and sintering becomes cap 10, is compressed between upper punch 40 and lower punches 42 and 44, with core rods 46, 48, 50, and 52 forming the holes 20 and 22.

The undercut 26 is not possible with solid die construction as this feature would not be able to eject from the die. Therefore, an outer punch 58 is used to form the undercuts 26. All of the punches and core rods move within a die cavity, which may be rectangular, in die 60.

To produce the compact, the punches 40, 42 and 44 act as the "die" for the formation of the snap width with undercuts. Upon compaction, the motions are such that simultaneous compaction takes place from the lower punches 42 and 44 and upper punch 40. This ensures even density around the outer punch 58 which is forming the undercut. Without the simultaneous compaction from the top and bottom, there is a good possibility that the punches will break. When compaction is completed, the compact 10' is ejected from the die.

In the ejection step, the outer punch 58 forming the undercut 26 is ejected with the compact 10'. It is ejected so the compact 10' clears the upper surface of die 60 such that the compact 10' can be slid sideways or laterally out from between the two legs of the outer punch 58, in the direction parallel to the thickness of the compact 10' (i.e., in the direction either into or out of the paper in FIGS. 3 and 4). This is different than conventional compaction processes where the punches remain in the die. The reason the outer punch 58 is ejected is so the compact 10' can be removed from the tooling. Removal is done by either pushing the compact laterally from between the legs of the outer punch 58 with the feeder box, or using automation such as robots. After removal, the outer punch 58 moves back into the compaction position shown in FIG. 3 for the next filling and compaction cycle and the next compact 10' is made.

After compaction, the compact 10' may be sintered to form the cap 10. Because the compact 10' had the undercut feature formed in it during the compaction step, it is unnecessary to machine the undercut feature into the cap 10 after sintering. This reduces the cost and time required to fabricate the cap 10.

A preferred embodiment of the invention has been described in considerable detail. Many modifications and variations to the preferred embodiment described will be apparent to a person of ordinary skill in the art. Therefore, the invention should not be limited to the embodiment described.

We claim:

1. A powder metal main bearing cap having a top surface, a bottom surface defining a portion of a cylindrical surface, side surfaces between the top and bottom surfaces, and end surfaces between the side surfaces and between the top and bottom surfaces, the powder metal main bearing cap comprising a bridge having the portion of the cylindrical surface and extending from a first leg to a second leg, the end surfaces defining surfaces of the legs and having an undercut formed in at least one of the end surfaces during compaction of powder metal into the shape of the bearing cap, the undercut being formed by powder metal compaction in the end surface of the powder metal main bearing cap such that the undercut is offset inwardly from portions of the end surface that are above and below the undercut.

2. A powder metal main bearing cap as claimed in claim 1, further comprising another undercut formed in the other end surface during the compaction process.

3. A powder metal main bearing cap as claimed in claim 1, further comprising a bolt hole extending through at least one of the first leg and the second leg.

4. A powder metal main bearing cap compact having a top surface, a bottom surface defining a portion of a cylindrical surface, side surfaces between the top and bottom surfaces and end surfaces between the side surfaces and between the top and bottom surfaces, the powder metal main bearing cap compact comprising a bridge having the portion of the cylindrical surface and extending from a first leg to a second leg, the end surfaces defining surfaces of the legs and having an undercut formed in at least one of the end surfaces during compaction of powder metal into the shape of the bearing cap compact, the undercut being formed by powder metal compaction in the end surface of the powder metal main bearing cap compact such that the undercut is offset inwardly from portions of the end surface that are above and below the undercut.

5. A powder metal main bearing cap compact as claimed in claim 4, further comprising another undercut formed in the other end surface during the compaction process.

6. A powder metal main bearing cap compact as claimed in claim 4, further comprising a bolt hole extending through at least one of the first leg and the second leg.

7. A method of forming a powder metal main bearing cap compact having a top surface, a bottom surface defining a portion of a cylindrical surface, side surfaces between the top and bottom surfaces, and end surfaces between the side surfaces and between the top and bottom surfaces, the method comprising:

providing an upper punch, a lower punch, an outer punch, and a die;

compacting a powder metal into a compact using the upper punch to form the top surface of the compact, the lower punch to form a bottom surface of the compact, and the outer punch to form the end surfaces of the compact having an undercut, each of the upper punch and the lower punch moving towards each other and towards the undercut along a direction of compaction;

retracting the upper punch after the compact has been formed; and ejecting the compact by raising the outer punch relative to the die, with the compact, such that the bottom surface of the compact clears an upper surface of the die, and moving the compact laterally such that the compact is ejected from the outer punch.

8. A method of forming a powder metal main bearing cap compact as claimed in claim 7, wherein moving the compact laterally means moving the compact in a direction perpendicular to the direction of compaction.

9. A method of forming a powder metal main bearing cap compact as claimed in claim 7, wherein the outer punch has two legs and the compact is formed between the two legs during the step of compacting.

10. A method of forming a powder metal main bearing cap compact as claimed in claim 9, wherein each of the two legs of the outer punch have a protrusion that forms the corresponding undercuts in each of the end surfaces.

11. A method of forming a powder metal main bearing cap compact as claimed in claim 7, further comprising:

providing a core rod;

compacting the powder metal into the compact using the core rod to form a bolt hole in the compact;

retracting the core rods after the compact has been formed.

12. A method of forming a powder metal main bearing cap compact as claimed in claim 7, wherein the at least one end surface of the compact having the undercut includes an upper end-facing surface and a lower end-facing surface between which the undercut is located, the undercut being inwardly offset from the upper end-facing surface and the lower end-facing surface.

13. A method of forming a powder metal main bearing cap compact as claimed in claim 12, wherein the upper end-facing surface and the lower end-facing surface lie along different planes.

14. A method of forming a powder metal main bearing cap compact as claimed in claim 7, wherein the upper punch and the lower punch move towards each other simultaneously during the compaction step.

* * * * *